US010448655B2

(12) United States Patent
Cho

(10) Patent No.: US 10,448,655 B2
(45) Date of Patent: Oct. 22, 2019

(54) CHOCOLATE CONFECTIONERY PREPARATION METHOD AND CHOCOLATE CONFECTIONERY PREPARED THEREBY

(71) Applicant: AUREATE CO., LTD., Incheon (KR)

(72) Inventor: Ik Gil Cho, Incheon (KR)

(73) Assignee: AUREATE CO., LTD., Incheon (KR)

(*) Notice: Subject to any disclaimer, the term of this patent is extended or adjusted under 35 U.S.C. 154(b) by 110 days.

(21) Appl. No.: 15/521,714

(22) PCT Filed: Feb. 17, 2015

(86) PCT No.: PCT/KR2015/001635
§ 371 (c)(1),
(2) Date: Apr. 25, 2017

(87) PCT Pub. No.: WO2016/076482
PCT Pub. Date: May 19, 2016

(65) Prior Publication Data
US 2017/0238574 A1    Aug. 24, 2017

(30) Foreign Application Priority Data
Nov. 11, 2014    (KR) .................. 10-2014-0156120

(51) Int. Cl.
*A23G 1/54*    (2006.01)
*A23G 1/00*    (2006.01)
*A23G 1/50*    (2006.01)

(52) U.S. Cl.
CPC .............. *A23G 1/54* (2013.01); *A23G 1/005* (2013.01); *A23G 1/0063* (2013.01); *A23G 1/50* (2013.01); *A23V 2002/00* (2013.01)

(58) Field of Classification Search
None
See application file for complete search history.

(56) References Cited

U.S. PATENT DOCUMENTS

2006/0110493 A1* 5/2006 Schnieber .............. A21D 6/001
426/93

FOREIGN PATENT DOCUMENTS

JP    10-028533    2/1998
JP    2004-057143    2/2004
(Continued)

OTHER PUBLICATIONS

International Search Report for International Application No. PCT/KR2015/001635 with English translations, dated Jul. 21, 2015, pp. 1-4 no translation found considered only as disclosed.
(Continued)

*Primary Examiner* — Kelly J Bekker
(74) *Attorney, Agent, or Firm* — Kile Park Reed & Houteman PLLC

(57) ABSTRACT

The invention is a chocolate confectionery preparation method improving with good taste and texture, and chocolate confectionery. The method comprises steps of: molding chocolate balls; forming a first coating layer by coating the chocolate balls with a first coating solution, and sprinkling weak flour on the same; drying the first coating layer; forming a second coating layer by coating the first coating layer with a second coating solution, and mixing and sprinkling weak flour and pregelatinized starch; forming a third coating layer by coating the second coating layer with a third coating solution, and mixing and sprinkling weak flour and pregelatinized starch; forming a fourth coating layer by coating the third coating layer with the sugar liquor and sprinkling weak flour on the same; roasting a half-finished product having the fourth coating layer; and sweetening the roasted half-finished product.

4 Claims, 3 Drawing Sheets

(56) References Cited

FOREIGN PATENT DOCUMENTS

KR  10-1173205  8/2012
WO  2013-051687  4/2013

OTHER PUBLICATIONS

International Preliminary Report on Patentability dated May 16, 2017 and English Translation of Written Opinion of the International Searching Authority dated Jul. 21, 2015 associated with International Application No. PCT/KR2015/001635, pp. 1-8.

* cited by examiner

CHOCOLATE CONFECTIONERY PREPARATION METHOD AND CHOCOLATE CONFECTIONERY PREPARED THEREBY

TECHNICAL FIELD

The present invention relates to: a chocolate confectionery preparation method and chocolate confectionery prepared thereby, and more particularly, to a novel chocolate confectionery preparation method improving productivity and capable of preparing chocolate confectionery with good taste and texture, and chocolate confectionery prepared thereby.

BACKGROUND ART

As shown in FIG. 1, a chocolate confectionery having a chocolate core 2 is provided inside a snack portion 4 having a ball shape. Since the conventional chocolate confectionery is manufactured by first forming the snack portion 4 and then injecting the chocolate 2 into the snack portion 4, the chocolate is not exposed to heat and moisture during the manufacturing process of the confectionery. Accordingly, it is advantageous that taste is not lowered. However, since a filling inlet 5 into which the chocolate 2 is injected is formed in the snack portion 4, it is not visually preferable.

In addition, a sufficient space for injecting the chocolate into the snack portion 4 should be formed, which requires a lot of expansion of the snack portion 4. As a result, a relatively large quantity of swelling agents such as baking powder should be included in dough forming the snack portion 4. However, if the swelling agent is contained in such a large amount, the overall flavor of the chocolate confectionary is undesirably deteriorated.

Meanwhile, in order to solve the problem, a method of manufacturing chocolate confectionery that minimizes the exposure of chocolate to heat and moisture during the manufacturing process has been proposed by the present applicant in the Korean Patent Registration No. 10-1173205.

In this conventional method of manufacturing chocolate confectionery, a shellac layer is formed inside to protect the chocolate from moisture, and the shellac layer functions as a waterproof layer to protect the chocolate from moisture.

Meanwhile, in order to increase the waterproof effect by the shellac layer, the shellac layer must be formed to have a predetermined thickness. For this, the process of coating and drying the shellac is repeated a plurality of times. However, since the shellac has a high viscosity and is not dried easily, it takes a considerable time to form the shellac layer to a required thickness, which causes the productivity of the product to deteriorate.

In addition, since the shellac layer is considerably hard, the texture of the chocolate confectionery is lowered by the shellac layer, and since the shell layer is caught on the teeth after eating the chocolate confectionery, the overall affinity for the products among consumers is not high.

DISCLOSURE

Technical Problem

The present invention has been made to solve the above problems, and it is an object of the present invention to provide a novel chocolate confectionery preparation method which shortens a manufacturing time to thus improve productivity and which allows for manufacturing chocolate confectionery with good taste and texture and without deteriorating the flavor of chocolate during the manufacturing process thereof, and chocolate confectionery made thereby.

Technical Solution

According to one aspect of the present invention, a chocolate confectionery preparation method and chocolate confectionery prepared thereby are provided, the method comprising the steps of: molding chocolate balls 2; forming a first coating layer 10 by coating the chocolate balls 2 with a first coating solution, which comprises a liquid sugar, shortening and lecithin, and sprinkling weak flour on the same; drying the first coating layer 10; forming a second coating layer 20 by coating the first coating layer 10 with a second coating solution, which comprises starch syrup and ammonium carbonate, and mixing and sprinkling, on the same, weak flour and pregelatinized starch; forming a third coating layer 30 by coating the second coating layer 20 with a third coating solution, which comprises the liquid sugar and ammonium carbonate, and mixing and sprinkling, on the same, weak flour and pregelatinized starch; forming a fourth coating layer 40 by coating the third coating layer 30 with the liquid sugar and sprinkling weak flour on the same; roasting the chocolate balls having the fourth coating layer 40; and sweetening the roasted chocolate balls.

According to another aspect of the present invention, the first coating layer 10 is dried at 23° C. to 25° C. for about 6 hours.

According to still another aspect of the present invention, the roasting process is performed at 180° C. to 260° C. for 2 to 3 minutes using a hot air oven.

According to yet another aspect of the present invention, the step of sweetening the roasted chocolate balls is performed by coating the surface of the roasted chocolate balls with edible oil and sprinkling powdered sweetener.

Advantageous Effects

Since the first coating layer 10 functions as a waterproof layer because the shortening is mixed with the first coating solution forming the first coating layer 10, in the present invention having the above-described configuration, chocolate balls 2 are protected from moisture by the first coating layer 10, and the chocolate balls 2 are roasted while minimizing heat exposure of the chocolate balls 2 to protect the chocolate balls 2 from heat.

Since the chocolate balls 2 are protected from moisture and heat in the process of manufacturing the chocolate confectionery, the chocolate confectionery produced according to the present invention maintains the flavor of the chocolate without deteriorating its flavor. Therefore, the taste of the chocolate confectionery is good and the excessively hard shellac layer is not formed. As well, the second, third, and fourth coating layers 20, 30, and 40 forming the snack portion are formed to have a crispy texture, respectively, so that the second, third, and fourth coating layers 20, 30, and 40 have the better texture than the conventional chocolate confectionery.

In addition, since the first coating layer 10 functions as a waterproof layer as described above, the present invention does not need to form a shellac layer for protecting the chocolate ball from moisture as in the conventional art. Therefore, the manufacturing process is shortened and the productivity is improved, in comparison with the conventional method of manufacturing the chocolate confectionery.

In addition, when the chocolate confectionery is seasoned by coating the edible oil on the chocolate balls which is roasted to then form the snack portion and by sprinkling the powdered sweetener, the sweetener is adhered to the surface of the snack portion by the edible oil so that the seasoning is effectively performed. Not only does the edible oil improves the sweetness of the confectionery, but the edible oil also prevents the snack portion from absorbing moisture and becoming damp during a distribution process of the confectionery.

BEST MODE

Hereinafter, preferred embodiments of the present invention will be described with reference to the drawings.

Figure 1:
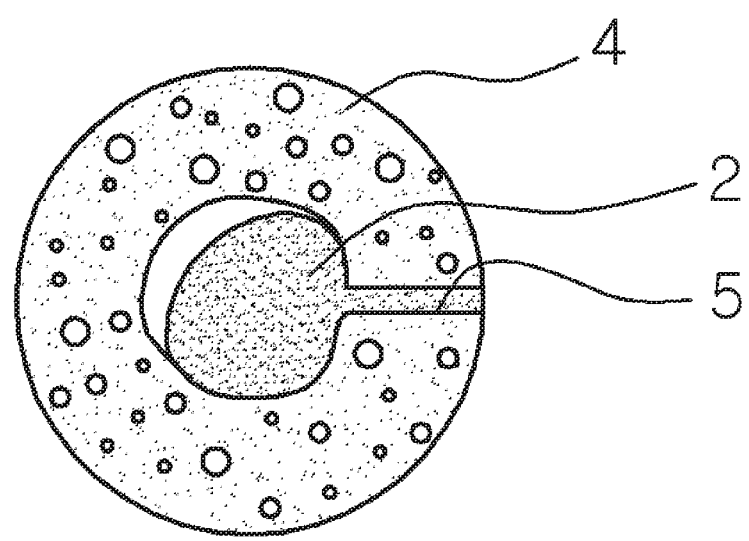
FIG. 1 is a cross-sectional view of a conventional chocolate confectionery.
Figure 2:
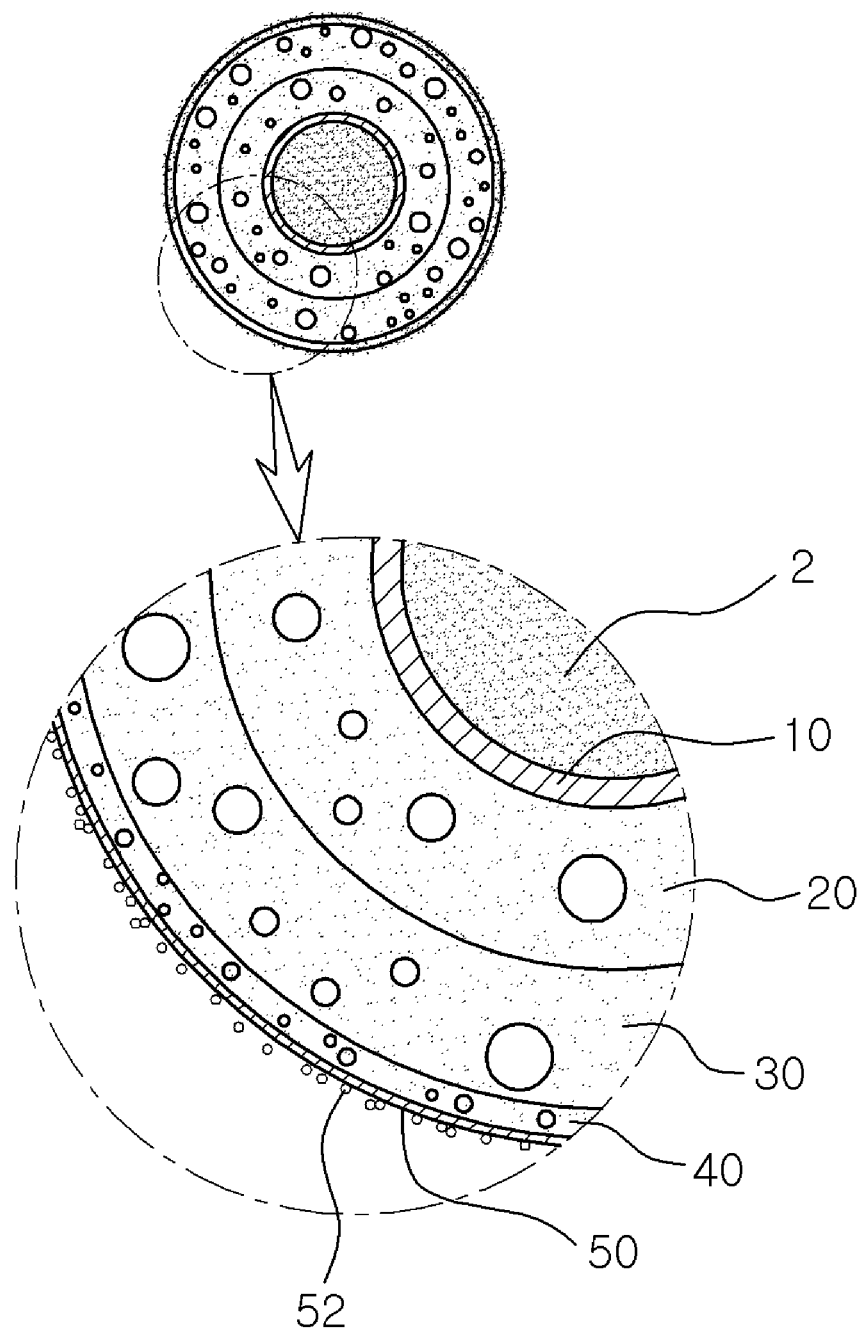
FIG. 2 is a cross-sectional view of a chocolate confectionery according to a preferred embodiment of the present invention.
Figure 3:
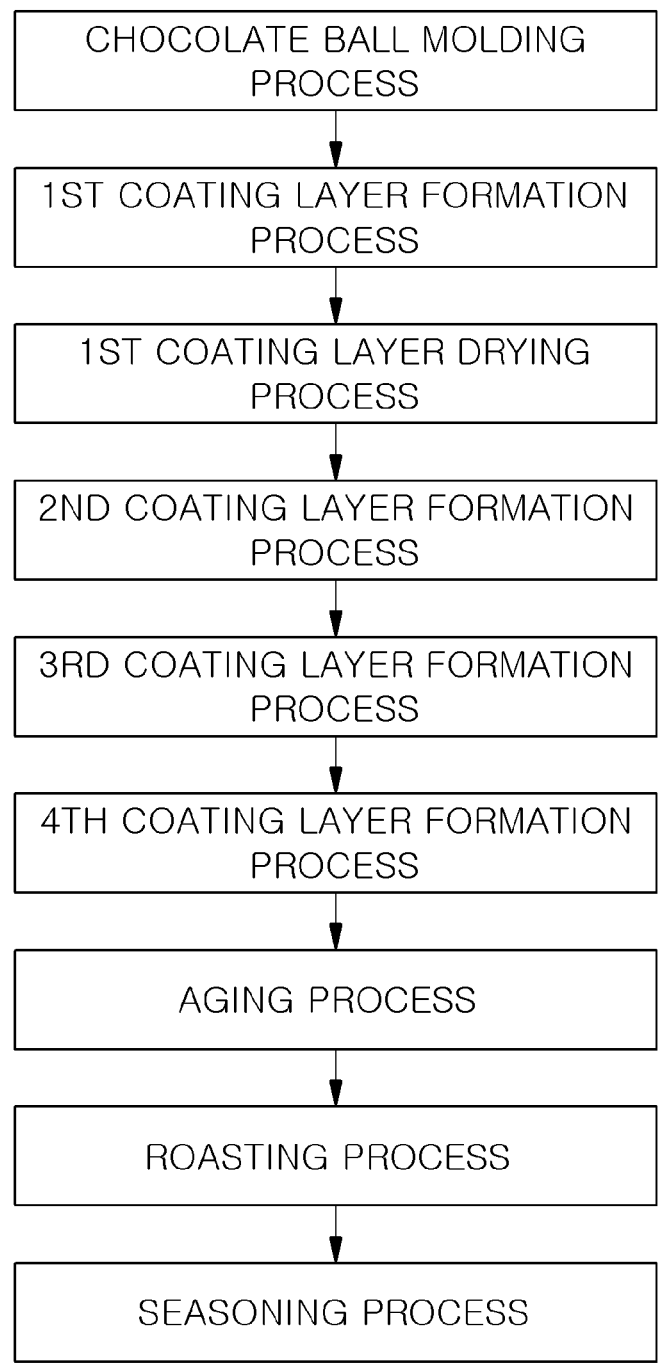
FIG. 3 is a flowchart view illustrating a method of manufacturing the chocolate confectionery of the embodiment of FIG. 2.

FIG. 2 is a cross-sectional view of a chocolate confectionery according to a preferred embodiment of the present invention, and FIG. 3 is a flowchart view illustrating a method of manufacturing the chocolate confectionery of the embodiment of FIG. 2.

As shown in FIG. 2, a chocolate confectionery according to a preferred embodiment of the present invention includes a chocolate ball 2, a first coating layer 10, a second coating layer 20, a third coating layer 30, and a fourth coating layer 40, which are sequentially formed on the circumference of the chocolate ball 2, an edible oil layer 50 coated on the surface of the fourth coating layer 40, and a sweetener powder 52 attached to the edible oil layer 50 by the edible oil layer 50.

The chocolate confectionery according to the preferred embodiment of the present invention having such a structure is produced in the following manner.

1. Chocolate Ball Molding Process

The melted chocolate is formed into a ball shape using a molding machine. As being the case, when the surface of the chocolate ball 2 is not smoothly formed, hot air is applied to the chocolate ball 2 to melt the surface of the chocolate ball 2 to trim the surface of the chocolate ball 2 smoothly.

2. First Coating Layer Formation Process

The first coating solution is coated on the surface of the chocolate balls 2 and weak flour is sprinkled on the surface of the chocolate balls 2 to form a first coating layer 10.

The first coating solution is a mixture of a liquid sugar, shortening, and lecithin. Preferably, the first coating solution is prepared by mixing shortening and lecithin when preparing the liquid sugar.

As the shortening is mixed with the first coating solution, the first coating solution has a waterproof function, and thus the chocolate balls 2 are protected from moisture by the first coating layer 10 formed by the first coating solution. The lecithin is an emulsifier so that the shortening is mixed with the liquid sugar.

The more the shortening is mixed with the first coating solution, the better the waterproofness of the first coating solution. However, the more the shortening is mixed, the more the flavor of the chocolate confectionery may be felt greasy, and the coating property of the first coating solution undesirably deteriorates. Preferably, 44.99% by weight of sugar, 40% by weight of water, 15% by weight of shortening and 0.01% by weight of lecithin are mixed and heated in a low flame until the sugar is melted, to thereby prepare the first coating layer 10.

The process of forming the first coating layer 10 may be repeated a plurality of times.

3. First Coating Layer Drying Process

The first coating layer 10 is dried such that the moisture content of the first coating layer 10 is approximately 20% to 22% or less. This process is performed by drying the chocolate balls 2 having the first coating layer 10 formed therein in a dryer. The temperature of the dryer is set at 23° C. to 25° C. and dried for about 6 hours.

Generally, chocolate begins to melt at about 30° C., and when the chocolate is repetitively melted and hardened, the flavor of the chocolate is lowered. Accordingly, the first coating layer 10 is dried at a temperature lower than the temperature at which the chocolate starts to melt, thereby preventing the chocolate from melting during the drying process.

4. Second Coating Layer Formation Process

The second coating solution is coated on the surface of the first coating layer 10, and the second coating layer 20 is formed by sprinkling a mixture of weak flour and pregelatinized starch referred to as alpha starch thereon.

The second coating solution is a mixture of a liquid sugar, a starch syrup, and an ammonium carbonate aqueous solution, in which preferably the liquid sugar, the starch syrup, and the ammonium carbonate aqueous solution are mixed at a weight ratio of about 50:50:1.

The ammonium carbonate aqueous solution is a foaming agent, so that the second coating solution is foamed with ammonium carbonate. Thus, the second coating solution is roasted as described later, to thereby form a snack portion.

In the second coating solution, a starch syrup is used together with a liquid sugar. This is because, when a liquid sugar and a starch syrup are mixed together, the weak flour and the pregelatinized starch are more effectively attached on the first coating layer as compared with the case of using the liquid sugar alone.

Meanwhile, if only the weak flour is sprinkled on the surface of the second coating solution, the snack portion formed by the second coating layer 20 after roasting may be excessively hard and the texture may deteriorate. However, the pregelatinized starch may be puffed well in a roasting process to be described later, so that a snack portion having a crunchy texture can be formed without being excessively rigid. For this reason, in the present process, the second coating layer 20 is formed by mixing the weak flour and the pregelatinized starch. Preferably, the weak flour and the pregelatinized starch are mixed in a weight ratio of about 2:1.

The process of forming the second coating layer 20 may be also repeated several times.

5. Third Coating Layer Formation Process

The third coating solution is coated on the surface of the second coating layer 20, and the third coating layer 30 is formed by sprinkling a mixture of weak flour and pregelatinized starch thereon.

The third coating solution is prepared by mixing a liquid sugar and an ammonium carbonate aqueous solution. Preferably, the third coating solution 30 is prepared by mixing a liquid sugar and an ammonium carbonate aqueous solution at a weight ratio of 100:1.

In this process, a mixture of the weak flour and the pregelatinized starch that are mixed at a weight ratio of 1:3 is sprinkled. The process of forming the third coating layer 30 may be also repeated several times.

6. Fourth Coating Layer Formation Process

A fourth coating solution is coated on the surface of the third coating layer 30, and a fourth coating layer 40 is formed by sprinkling the weak flour. The fourth coating solution is the same as the third coating solution.

The third coating layer 30 is mixed with the weak flour and the pregelatinized starch. The third coating layer 30 has a surface that is mottled after roasting. This is because the weak flour contains the protein, and the Maillard reaction occurs by roasting, so that the protein becomes dark brown. However, the starch does not cause the Maillard reaction so that the color after roasting turns into a lighter color than the browning color.

If the third coating layer 30 is formed to form the outermost layer of the product, the appearance of the product is not good and the salability is deteriorated. Therefore, in the present invention, a fourth coating layer 40 is formed by sprinkling only the weak flour on the third coating layer 30, so that the fourth coating layer 40 forms the outermost layer of the product. As a result, the surface of the product is not formed in a speckled shape.

7. Aging Process

The chocolate balls in which the fourth coating layer 40 is formed is allowed to stand at room temperature for about two hours to be aged. After such an aging process, the flavor of the chocolate confectionery becomes even better.

8. Roasting Process

The aged chocolate balls having the fourth coating layer 40 is roasted in an oven. The chocolate ball having the fourth coating layer 40 is preferably roasted in hot air using a hot-air oven to ensure that the chocolate balls 2 are as less exposed to heat as possible during the roasting process.

More specifically, roasting is carried out at 180° C. to 260° C. for 2 to 3 minutes. The chocolate balls having the fourth coating layer 40 is first roasted in the oven at a temperature of 260° C. for a short time, and the temperature of the oven is gradually lowered to about 180° C. Second roasting is performed so as to be roasted sufficiently to the inside of the chocolate balls having the fourth coating layer 40. Then, the temperature of the oven is raised to about 240° C. to completely remove moisture, thereby finishing the roasting process.

During the roasting process, the first, second, third and fourth coating layers 10, 20, 30 and 40 are baked. Since the first coating layer 10 does not contain a swelling agent, the first coating layer 10 does not expand during the roasting process. Therefore, the first coating layer 10 has a dense structure in which pores are not formed even after roasting. Since the first coating layer 10 has a dense texture and the first coating layer 10 functions as a waterproof layer by the shortening as described above, the chocolate balls 2 are protected from moisture by the first coating layer 10.

Meanwhile, the second, third, and fourth coating layers 20, 30, and 40 are expanded in the roasting process to form a snack portion having a crispy texture. Since the coating solution forming the second, third and fourth coating layers 20, 30 and 40 and the powder sprinkled are different from each other, the second, third and fourth coating layers 20, 30 and 40 have different textures. Thus, these different textures are mixed with one another, to thereby provide the overall harmonized texture.

9. Seasoning Process

When roasting is over, seasoning starts by coating chocolate confectionery with edible oil before the chocolate confectionery are cooled and powdered sweeteners are sprinkled on the chocolate confectionery. The flavor of the chocolate confectionery can be improved by this seasoning process. In addition, various kinds of flavors can be obtained by different kinds of sweeteners. Preferably, palm oil is used as the edible oil.

When the edible oil is coated on the chocolate confectionery and the sweetener is sprinkled, the sweetener powder is adhered to the surface of the chocolate confectionery by the edible oil. That is, the edible oil not only attaches the sweetener to the snack portion, but also improves the sweet taste of the snack portion and the snack portion is prevented from absorbing moisture and being dampened by the edible oil during a distribution process of the chocolate confectionery.

Reference numeral 50 denotes an edible oil layer, and reference numeral 52 denotes a sweetener powder attached to the edible oil layer 50.

As can be seen from a sensory test result described below, the present invention, which is produced by the above-described method, is superior in the texture compared with the conventional method, and the manufacturing process is also shortened, and the productivity is also improved.

Example

Chocolate confectionery have been prepared as described above and subjected to a sensory test. As a comparative example, chocolate confectionery have been prepared by the method of Korean Patent Registration No. 10-1173205 using Shellac, and the sensory test was conducted.

The sensory test was conducted on 50 panels of men and women. The results are shown in Table 1.

TABLE 1

| Items | | Examples | Comparative Examples |
|---|---|---|---|
| taste | tasty | 48 | 46 |
| | common | 2 | 4 |
| | Untasty | 0 | 0 |
| crispy | crispy | 50 | 42 |
| | hard | 0 | 8 |
| foreign body sensation | There is no sense of foreign body in the teeth after eating. | 50 | 35 |
| | There is a sense of foreign body in the teeth after eating. | 0 | 15 |
| shape | good-looking | 50 | 46 |
| | bad-looking | 0 | 4 |
| overall preference | good | 58 | 37 |
| | average | 2 | 8 |
| | bad | 0 | 5 |

What is claimed is:

1. A chocolate confectionery preparation method, the method comprising the steps of:
    molding chocolate balls (2);
    forming a first coating layer (10) by coating the chocolate balls with a first coating solution, which comprises a liquid sugar, shortening and lecithin, and sprinkling weak flour on the same;
    drying the first coating layer (10);
    forming a second coating layer (20) by coating the first coating layer (10) with a second coating solution, which comprises starch syrup and ammonium carbonate, and mixing and sprinkling, on the same, weak flour and pregelatinized starch;

forming a third coating layer (30) by coating the second coating layer (20) with a third coating solution, which comprises the liquid sugar and ammonium carbonate, and mixing and sprinkling, on the same, weak flour and pregelatinized starch;

forming a fourth coating layer (40) by coating the third coating layer (30) with the liquid sugar and sprinkling weak flour on the same;

roasting the chocolate balls having the fourth coating layer (40); and sweetening the roasted chocolate balls.

2. The method of claim 1, wherein the drying of the first coating layer is performed in a drier at 23° C. to 25° C. for about 6 hours.

3. The method of claim 1, wherein the roasting is performed at 180° C. to 260° C. for 2 to 3 minutes using a hot air oven.

4. The method of claim 1, wherein the sweetening of the roasted chocolate balls comprises coating the surface of the roasted chocolate balls with edible oil and sprinkling the powdered sweetener.

\* \* \* \* \*